UNITED STATES PATENT OFFICE.

PHILLIP PHILLIPS, OF BALLAN, VICTORIA.

WOOD-FILLER.

SPECIFICATION forming part of Letters Patent No. 614,024, dated November 8, 1898.

Application filed April 14, 1897. Serial No. 632,147. (No specimens.)

*To all whom it may concern:*

Be it known that I, PHILLIP PHILLIPS, coach-builder, a subject of the Queen of the United Kingdom of Great Britain and Ireland, and a resident of Ballan, in the Colony of Victoria, have invented certain new and useful Improvements in Wood-Fillers, (for which I have obtained a patent in Victoria, No. 13,658, dated October 31, 1896,) of which the following is a specification.

My invention relates to a composition of matter to be used as a filler, as set forth in the specification, and particularly pointed out in the claims.

My filling composition consists of white lead, ground pumice-stone, powdered asbestos, varnish, and ground commercial pyrites mixed together. The pyrites have an excellent effect in giving durability and hardness without brittleness. It is obvious, of course, that any desired coloring ingredients may be added and that any of the various driers well known in the art may be added to make the combination slow-drying, medium-drying, or quick-drying, as desired.

The proportions of the various ingredients may be varied; but in each case and whatever the proportions the composition claimed has been found by experiment to produce highly useful results. Not only does this composition when applied and allowed to dry produce a surface of great smoothness, but it also possesses remarkable weather-resisting properties.

Another advantage of my composition is that it does not produce an absorbent surface, and consequently a smaller amount of paint is required than is used with ordinary fillings.

The proportions of this composition as ordinarily used are as follows: white lead, eight pounds; ground pumice-stone, four ounces; powdered asbestos, eight ounces; varnish, one and one-half pints; powdered pyrites, two pounds.

The proportion of varnish may be increased if it is desired to make the composition quick-drying. The asbestos used increases materially the heat-resisting qualities of the composition.

This composition may be used as a substitute for putty or similar materials by increasing the percentage of asbestos and pyrites and decreasing the percentage of white lead. It may also be used as a liquid-filling by thinning it with turpentine. The various ingredients are thoroughly mixed and ground together.

Having thus described my invention, what I claim, and desire to secure by Letters Patent of the United States, is—

1. A wood-filler, composed of white lead, ground pumice-stone, powdered asbestos, varnish and powdered pyrites substantially as set forth.

2. A wood-filler, composed of the following ingredients mixed in the following proportions; white lead, eight pounds, ground pumice-stone, four ounces, powdered asbestos, eight ounces, varnish, one and one-half pints, and powdered pyrites, two pounds, substantially as described.

In witness whereof I have hereunto set my hand in the presence of two subscribing witnesses.

PHILLIP PHILLIPS.

Witnesses:
G. G. TURRI,
W. H. CUBLEY.